(12) United States Patent
Kambouris

(10) Patent No.: US 6,196,405 B1
(45) Date of Patent: Mar. 6, 2001

(54) PERSONAL ORGANIZER CASE SYSTEM

(75) Inventor: Tom Kambouris, Jackson, WY (US)

(73) Assignee: Rhinoskin, Inc., Jackson, WY (US)

( * ) Notice: Subject to any disclaimer, the term of this patent is extended or adjusted under 35 U.S.C. 154(b) by 0 days.

(21) Appl. No.: 09/215,570

(22) Filed: Dec. 16, 1998

(51) Int. Cl.[7] ................................................. B65D 43/00
(52) U.S. Cl. ...................... 220/4.22; 220/4.02; 206/701
(58) Field of Search ................................ 220/4.22, 4.02, 220/812; 206/701, 521

(56) References Cited

U.S. PATENT DOCUMENTS

| 4,048,050 | * | 9/1977 | Hillman | 220/812 X |
| 5,203,469 | * | 4/1993 | Chang et al. | 220/812 |
| 5,207,342 | * | 5/1993 | Tsuji et al. | 220/4.02 |
| 5,392,906 | * | 2/1995 | Taniyama | 220/4.27 X |
| 5,495,389 | * | 2/1996 | Dewitt et al. | 220/4.02 X |
| 5,697,955 | * | 12/1997 | Stolte | 206/701 X |

* cited by examiner

*Primary Examiner*—Steven Pollard
(74) *Attorney, Agent, or Firm*—Michael S. Neustel

(57) ABSTRACT

A personal organizer case system for protecting a personal organizer without interfering with the user's day-to-day operation of the personal organizer. The inventive device includes a base having a pair of hinge pins, and a cover having a pair of opposing slots that slidably receive the pair of hinge pins. The base is formed to snugly retain a personal organizer. The cover is opened and closed upon the base by the hinge pins. When opened, the cover slides underneath and about the base to provide a compact holding unit for allowing uninterrupted usage of the personal organizer. The base and cover are preferably constructed of titanium for reducing the overall weight and increasing the overall strength of the invention. Wall padding and plate padding is utilized within the base to cushion any movement to the personal organizer. The cover preferably includes a pair of corner pads. In an alternative embodiment, a pair of corresponding catch channels are utilized at the end of the slots to retain the cover next to base when in the open position for preventing movement of the cover.

10 Claims, 5 Drawing Sheets

PERSONAL ORGANIZER CASE SYSTEM

BACKGROUND OF THE INVENTION

1. Field of the Invention

The present invention relates generally to computer case and more specifically it relates to a personal organizer case system for protecting a personal organizer without interfering with the user's day-to-day operation of the personal organizer.

Personal organizers are becoming increasingly popular amongst consumers. Personal organizers can also be extremely expensive for the consumer. Two popular brands of personal organizers are the 3Com PalmPilots and the IBM Workpads. Both have a liquid crystal display and keypad for displaying and entering information. They also have extremely sensitive electronics within that can be damaged by vibrations, electromagnetic fields, weight being placed upon them, or by the user dropping them. Conventional computer cases are comprised of a leather "book style" that provide little protection to exterior forces. Hence, there is a need for a case that is capable of protecting the personal organizer without interfering with the normal day-to-day operation of it.

2. Description of the Prior Art

Computer cases have been in use for years. Typically, a conventional computer case has a resilient exterior and a soft interior for storing the computer. The conventional computer case generally has a cover that is pivotally attached to a base that receives the computer. The user generally must remove the computer from the conventional computer case to properly utilize the computer because conventional computer cases tend to be bulky and awkward to utilize efficiently.

While these devices may be suitable for the particular purpose to which they address, they are not as suitable for protecting a personal organizer without interfering with the user's day-to-day operation of the personal organizer. Conventional cases are bulky and awkward to utilize. In addition, conventional cases generally have a lid or cover that is pivoted outwardly that interferes with usage.

In these respects, the personal organizer case system according to the present invention substantially departs from the conventional concepts and designs of the prior art, and in so doing provides an apparatus primarily developed for the purpose of protecting a personal organizer without interfering with the user's day-to-day operation of the personal organizer.

SUMMARY OF THE INVENTION

In view of the foregoing disadvantages inherent in the known types of computer cases now present in the prior art, the present invention provides a new personal organizer case system construction wherein the same can be utilized for protecting a personal organizer without interfering with the user's day-to-day operation of the personal organizer.

The general purpose of the present invention, which will be described subsequently in greater detail, is to provide a new personal organizer case system that has many of the advantages of the computer cases mentioned heretofore and many novel features that result in a new personal organizer case system which is not anticipated, rendered obvious, suggested, or even implied by any of the prior art computer cases, either alone or in any combination thereof.

To attain this, the present invention generally comprises a base having a pair of hinge pins, and a cover having a pair of opposing slots that slidably receive the pair of hinge pins. The base is formed to snugly retain a personal organizer. The cover is opened and closed upon the base by the hinge pins. When opened, the cover slides underneath and about the base to provide a compact holding unit for allowing uninterrupted usage of the personal organizer. The base and cover are preferably constructed of titanium for reducing the overall weight and increasing the overall strength of the invention. Wall padding and plate padding is utilized within the base to cushion any movement to the personal organizer. The cover preferably includes a pair of corner pads. In an alternative embodiment, a pair of corresponding catch channels are utilized at the end of the slots to retain the cover next to base when in the open position for preventing movement of the cover.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a personal organizer case system that will overcome the shortcomings of the prior art devices.

Another object is to provide a personal organizer case system that allows the personal organizer to be utilized while still positioned safely within the protective case.

An additional object is to provide a personal organizer case system that does not interfere with normal usage of the personal organizer.

A further object is to provide a personal organizer case system wherein during use of the personal organizer the cover is not significantly exposed.

Another object is to provide a personal organizer case system that is lightweight.

An additional object is to provide a personal organizer case system that effectively protects a personal organizer from damage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
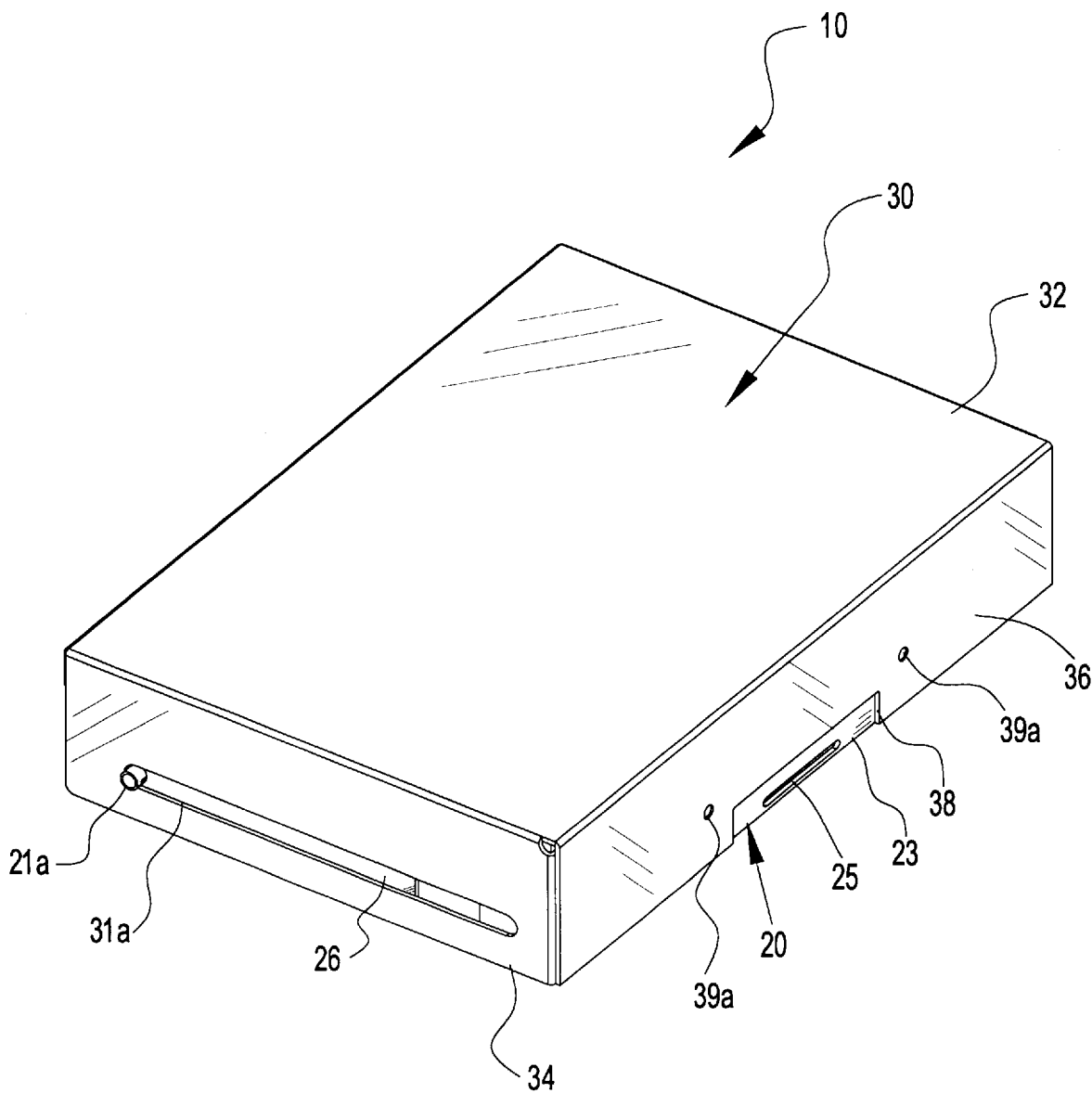
FIG. 1 is an upper perspective view of the present invention in the closed position.

Turning now descriptively to the drawings, in which similar reference characters denote similar elements throughout the several view, FIGS. 1 through 5 illustrate a personal organizer case system 10, which comprises a base 20 having a pair of hinge pins 21a–b, and a cover 30 having a pair of opposing slots 31a–b that slidably receive the pair of hinge pins 21a–b. The base 20 is formed to snugly retain a personal organizer 12. The cover 30 is opened and closed upon the base 20 by the hinge pins 21a–b. When opened, the cover 30 slides underneath and about the base 20 to provide a compact holding unit for allowing uninterrupted usage of the personal organizer 12. The base 20 and cover 30 are preferably constructed of titanium for reducing the overall weight and increasing the overall strength of the invention. The use of titanium is extremely important since maintaining the compactness of the invention along with retaining an extremely rigid structure is needed to prevent damage to the sensitive personal organizer 12 within. Wall padding and plate padding 60 is utilized within the base 20 to cushion any movement to the personal organizer 12. The cover 30 preferably includes a pair of corner pads 40. In an alternative embodiment, a pair of corresponding catch channels 70 are utilized at the end of the slots 31a–b to retain the cover 30 next to base 20 when in the open position for preventing movement of the cover 30.

A personal organizer 12 has a generally rectangular shaped housing 13, a display 16 and a keypad 18 for entering data. Today, a personal organizer 12 will also typically have an infrared port for allowing the transfer of file information to and from a personal computer.

Figure 4:
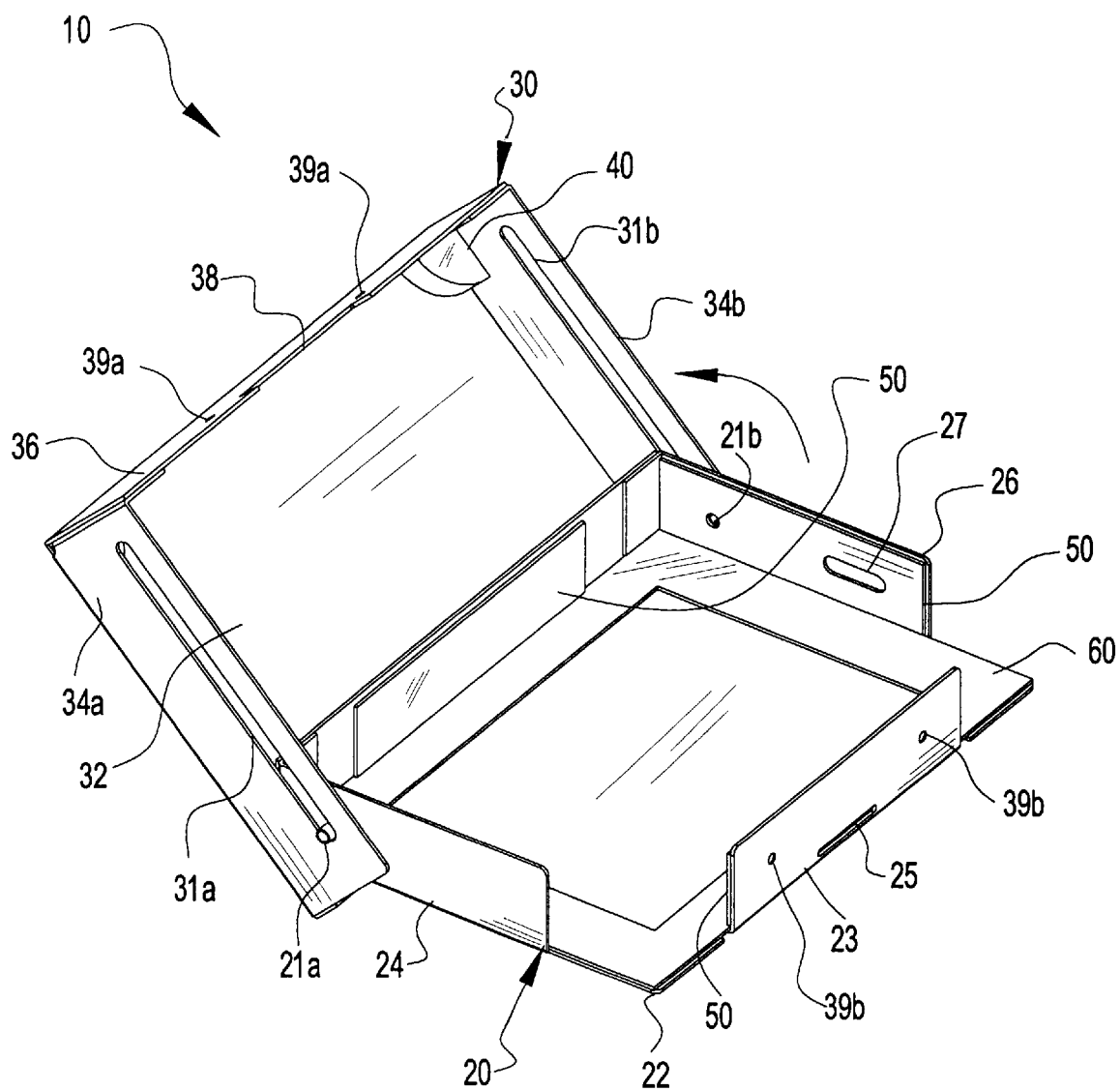
FIG. 4 is an upper perspective view of the present invention being opened without the personal organizer positioned within.

As best shown in FIG. 4 of the drawings, the base 20 is comprised of a rear plate 22 and a first wall 28 extending orthogonally from a longitudinal edge of the base 20. The base 20 also includes a first member 24 and a second member 26 extending orthogonally from the rear plate 22 and in opposition to one another. A pair of flange members may be attached to the first member 24 and the second member 26 for assisting in retaining the personal organizer 12 within the base 20.

Figure 2:
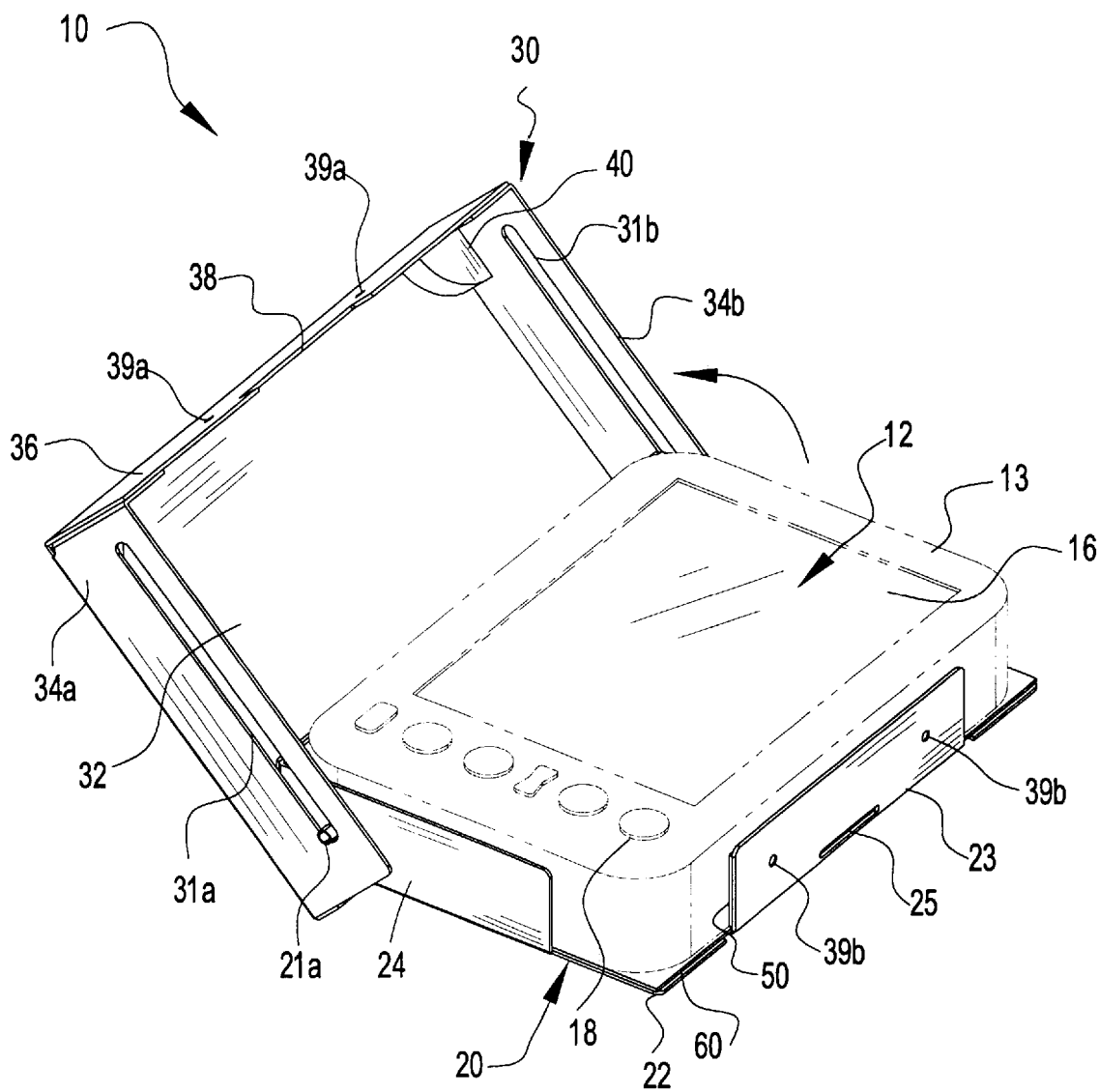
FIG. 2 is an upper perspective view of the present invention being opened with a personal organizer positioned within.
Figure 3:
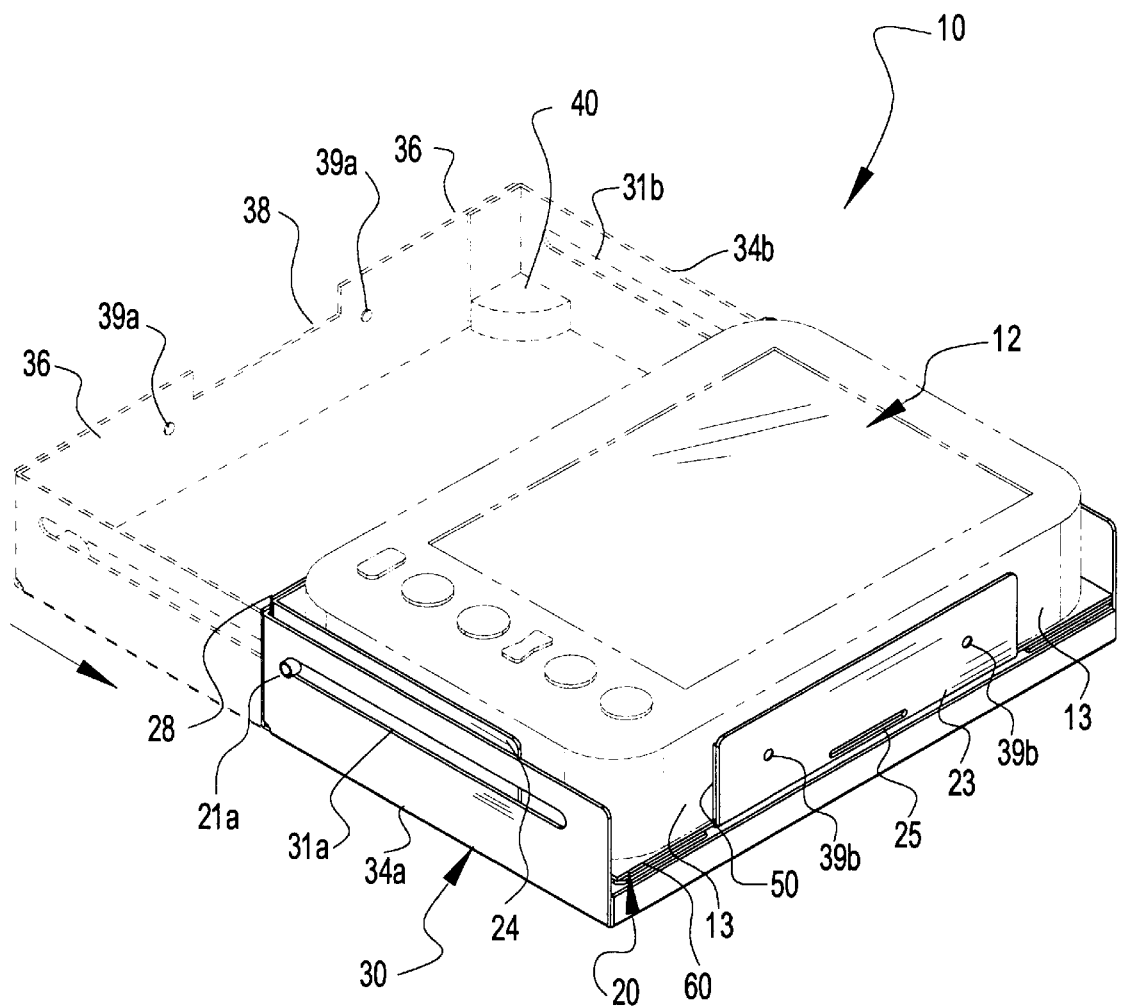
FIG. 3 is an upper perspective view of the present invention with the cover positioned in the open position about the base.

As shown in FIGS. 2 through 4, a lip 23 extends from the rear plate 22 in opposition to the first wall 28. A slit 25 is preferably positioned within a lower portion of the lip 23 for providing a gripping edge for the user to engage during opening of the invention.

The base 20 is formed to receive a personal organizer 12 such as a 3Com PalmPilot or an IBM Workpad as shown in FIGS. 2 and 3 of the drawings. An infrared aperture 27 is preferably within the second member 26 as shown in FIG. 4 for allowing communication between the infrared port of the personal organizer 12 and another electronic device regardless if the cover 30 is opened or closed.

As shown in FIG. 4, a pair of opposing hinge pins 21a–b extend from an upper portion of the first member 24 and the second member 26. The hinge pins 21a–b are preferably adjacent the first wall 28 as shown in FIG. 4. As further shown in FIGS. 2 through 3, there preferably is a length of space between the lip 23 and the first member 24.

There is also preferably a corresponding length of space between the lip 23 and the second member 26 for allowing manual manipulation of the personal organizer 12 within. As best shown in FIG. 4, a length of plate padding 60 is attached to the rear plate 22 for reducing vibration and shock to the personal organizer 12. In addition, wall padding 50 is preferably attached to the interior surfaces of the lip 23, the first member 24, the second member 26 and the first wall 28 to reduce vibration and shock to the personal organizer 12.

As best shown in FIGS. 1, 2 and 4, the cover 30 comprises a face plate 32, a pair of opposing end walls 34a–b extending from the face plate 32, and a second wall 36. The second wall 36 preferably has a U-shaped cutout 38 for allowing engagement of the lip 23 when the invention closed. The second wall 36 also preferably has a latch means such as the pair of dimples 39a that removably engage a corresponding pair of dimples 39b as shown in FIGS. 2 through 4 of the drawings. It can be appreciated by one skilled in the art that various other well-known latch means may be utilized.

As best shown in FIGS. 2 and 4, the end walls 34a–b have a corresponding pair of slots 31a–b that slidably receive the pair of hinge pins 21a–b. When being opened from the closed position, the cover 30 pivots upon the hinge pins 21a–b as shown in FIG. 2. After the cover 30 has been pivoted approximately 180 degrees, the cover 30 is slid underneath the base 20 as shown in FIG. 3 of the drawings. It should be noted that the infrared aperture 27 is aligned with the slot 31b in both the open and the closed position for allowing communication with an external electronic device. A pair of corner pads 40 are preferably attached to opposing corners within the cover 30 as shown in FIG. 4 to further protect the personal organizer 12 within the invention when in the closed position.

Figure 5:
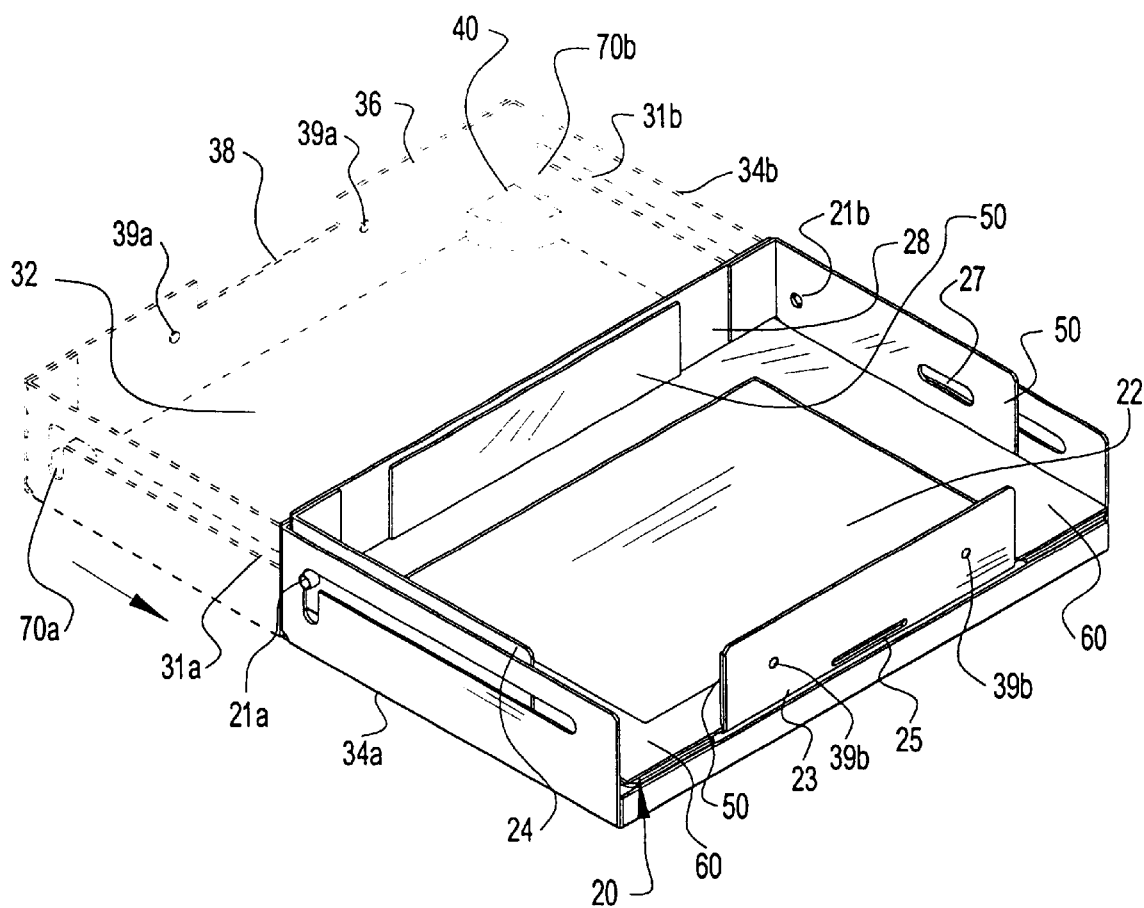
FIG. 5 is an upper perspective view of an alternative embodiment of the present invention showing catch channel for retaining the cover selectively locked about the base.

In an alternative embodiment shown in FIG. 5 of the drawings, a pair of catch channels 70 extend orthogonally from each of the slots 31a–b. The hinge pins 21a–b removably catch upon the catch channels 70 when the cover 30 is in the open position for preventing movement of the cover 30 while the user is holding the invention and the personal organizer 12.

In use, the user positions the personal organizer 12 within the base 20. The personal organizer 12 is snugly retained between the wall padding 50 that is attached to the base 20 thereby preventing movement or accidental removal of the personal organizer 12. The user then closes the cover 30 about the base 20 to prevent damage to the personal organizer 12 within. When the user desires to operate the personal organizer 12, the user engages the lip 23 of the base 20 and the cover 30 thereby separating them. The user then pivots the cover 30 as shown in FIG. 2 of the drawings approximately 180 degrees so as to be approximately parallel with the base 20 as shown in FIG. 3. The slots 31a–b are then substantially parallel to the base 20 thereby allowing the cover 30 to be slid underneath the base 20. Since the interior portion of the cover 30 is slightly wider than the outer surface of the base 20, the cover 30 fits uniformly about the base 20 as shown in FIG. 3 without any protrusions that would interfere with the user's usage of the personal organizer 12. When finished utilizing the personal organizer 12, the user reverses the above procedure so that the cover 30 is again protectively enclosing the personal organizer 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A personal organizer case system, comprising:
   a base having a floor and at least one lower wall extending from said floor, wherein said base is formed for receiving a personal organizer;
   a pair of hinge pins attached to opposing sides of said at least one lower wall of said base;
   a cover having a ceiling, at least one upper wall and an open portion within said at least one upper wall, wherein said cover is formed for fitting about the outer portion of said at least one upper wall wherein said; and
   a pair of slots extending into said at least one upper wall, wherein said pair of slots slidably receive said pair of hinge pins thereby allowing said cover to be positioned in a closed position about said base enclosing said base and within an open position about said base, wherein said open position comprises said ceiling of said cover being juxtaposed and parallel to said floor of said base.

2. The personal organizer case system of claim 1, including a latch means for selectively retaining said cover closed about said base.

3. The personal organizer case system of claim 2, wherein said latch means comprises at least one pair of dimples that are matingly connectable.

4. The personal organizer case system of claim 1, including padding within said base for protecting a personal organizer from damage.

5. The personal organizer case system of claim 1, wherein said base includes an aperture for allowing an infrared port of a personal organizer to communicate with an external electronic device while positioned within said base.

6. The personal organizer case system of claim 5, wherein said aperture within said base corresponds with a portion of one of said pair of slots within said base.

7. The personal organizer case system of claim 1, wherein said cover includes a pair of corner pads.

8. The personal organizer case system of claim 1, wherein said base and said cover are constructed of titanium.

9. The personal organizer case system of claim 1, wherein said base includes a pair of catch channels extending into said at least one upper wall connected orthogonally to said pair of slots opposite of a pivot point of said hinge pins for catchably receiving said hinge pins when said cover is positioned about said base.

10. A personal organizer case system, comprising:
    a base having a floor and at least one lower wall extending from said floor, wherein said base is formed for receiving a personal organizer;
    a pair of hinge pins attached to opposing sides of said at least one lower wall of said base;
    a cover having a ceiling, at least one upper wall and an open portion within said at least one upper wall, wherein said cover is formed for fitting about the outer portion of said at least one upper wall wherein said;
    a pair of slots extending into said at least one upper wall, wherein said pair of slots slidably receive said pair of hinge pins thereby allowing said cover to be positioned in a closed position about said base enclosing said base and within an open position about said base, wherein said open position comprises said ceiling of said cover being juxtaposed and parallel to said floor of said base;
    a latch means for selectively retaining said cover closed about said base;
    a padding within said base for protecting a personal organizer from damage;
    an aperture extending into said base for allowing an infrared port of a personal organizer to communicate with an external electronic device while positioned within said base, wherein said aperture within said base corresponds with a portion of one of said pair of slots within said base;
    a pair of corner pads within said cover; and
    wherein said base includes a pair of catch channels extending into said at least one upper wall connected orthogonally to said pair of slots opposite of a pivot point of said hinge pins for catchably receiving said hinge pins when said cover is positioned about said base.

\* \* \* \* \*